Dec. 4, 1923.
S. E. SHEPPARD ET AL
1,476,374
ELECTRODEPOSITION OF RUBBER COATINGS
Filed March 3, 1922
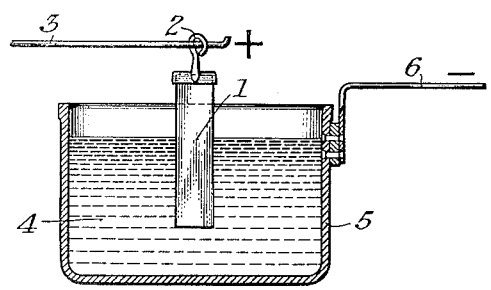
INVENTORS,
Samuel E. Sheppard & Leon W. Eberlin,
BY R. L. Stinchfield
ATTORNEY Patented Dec. 4, 1923.

1,476,374

UNITED STATES PATENT OFFICE.

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK.

ELECTRODEPOSITION OF RUBBER COATINGS.

Application filed March 3, 1922. Serial No. 540,800.

*To all whom it may concern:*

Be it known that we, SAMUEL E. SHEPPARD and LEON W. EBERLIN, a subject of the King of Great Britain and citizen of the United States of America, respectively, residing at Rochester, in the county of Monroe and State of New York, have invented certain new and useful Improvements in Electrodeposition of Rubber Coatings, of which the following is a full, clear, and exact specification.

This invention relates to the deposition of rubber on to conducting surfaces of objects, and to the subsequent treatment of a deposited layer. One object of the invention is to provide a process by which rubber may be quickly and inexpensively deposited upon articles having a conducting surface. Another object of the invention is to provide a process by which the deposited rubber will have associated therewith conditioning agents by means of which said rubber can be conditioned after deposition. Another object of the invention is to provide a process of coating with rubber without the fire hazard attending the use of an inflammable solvent. Other objects will hereinafter appear.

In the accompanying drawing, forming a part hereof, the single figure is a diagrammatic cross section of an apparatus employed in carrying out my process.

We have discovered that useful coatings of rubber may be electro-deposited upon conducting surfaces of objects when electro-conducting rubber emulsions are employed. While this discovery can be utilized in a great many specific ways, we shall enumerate a few of them purely by way of illustration.

We may, for example, prepare an electro-conducting emulsion in the following manner. Broadly any solution of rubber in an organic solvent is distributed in an aqueous solution of soaps or equivalent emulgents, this mixture being emulsified by agitation, grinding or spraying. Thus we may take 1000 cc. of a 5% solution of rubber (say plantation sheet) in benzol, which is diluted with 1000 cc. of kerosene. To this we may add 500 cc. of sulfonated castor oil (so-called water-soluble oil), and this mixture is then stirred into 3000 cc. of an aqueous solution containing 150 grams of castile soap, which is the main emulsifying agent. The sulfonated castor oil is not indispensable, but is preferred as an auxiliary or intermediate emulsifier, by which term I include any equivalent substance which similarly assists the main emulsifying agent in bringing and maintaining the rubber in the emulsified state. Nor is the kerosene vital, but we prefer to use some such diluent, especially since its quantity is so small as not to appreciably increase the fire hazard during use.

One or more pigments, like lampblack, may be added if desired to the original rubber solution before emulsification. Vulcanizing agents, like sulfur, can also, if desired, be added to the rubber solution prior to emulsification, or they may be added in solution or in colloidal form to the emulsion, being properly stirred therein. Likewise an accelerator of vulcanization, such as aniline sulfate, may be added to the rubber solution prior to emulsification. The quantities of these various conditioning agents will vary from zero to the amount necessary to effect the change desired. For lightly colored coatings and for coatings in which only partial vulcanization is to be obtained, only correspondingly small amounts of them need be incorporated in the emulsion. Since the proportions for effecting given results are substantially the same as those used heretofore, those skilled in this art will readily appreciate how to properly proportion the coatings.

The emulsion probably comprises very small droplets or globules of rubber, each surrounded by a film of the emulsifying agent. While we do not wish to be restricted by a particular theory, we believe that each droplet carries its proportion of the conditioning agents, such as pigment, sulfur, aniline sulfate, and the like when such agent or agents are employed. It is certain that the droplets carry these substances with them into the coating in useful amounts. It will be noted that this emulsion, whether conditioning agents be added or not, is substantially free from material in a fermentable state. By fermentable state we mean one in which harmful decomposition through microorganisms may take place.

In the example given above the droplets in the emulsion act as if negatively charged and, therefore, travel toward the anode. The electro-conducting surface 1 to be plated is, therefore, connected at 2 to anode line 3 to form the anode and is immersed in the emulsion. A suitable cathode is also placed in contact with the emulsion. For instance, the latter may be contained in a metal vessel 5 which is connected in the circuit of cathode line 6. The current should be an effectively unidirectional one. It may be a direct current of constant value, or a direct current of pulsating character. In certain instances a considerably unbalanced alternating current might prove to be useful. We prefer, however, to use an ordinary direct current at a voltage of approximately 110, because this is conveniently obtainable. The deposition can take place slowly at much lower voltages and more speedily at higher voltages. But at the value of 110 volts, the deposition takes place satisfactorily with a flow of approximately one-half ampere per square inch of anode surface to be coated. Ordinarily we prefer to conduct the deposition at room temperature. If, however, the temperature rises, because of energy consumption, no harmful results will be noted. The time of plating or coating under these conditions is very short, being of the order of five minutes.

It might be expected that only very thin coatings could be deposited due to the electrode surface becoming coated with an insulator. Practical work shows that this is not the case. Probably the deposit contains mingled therein, at least temporarily, sufficient electrolyte to enable the current to be conducted and the deposit to build up until a useful thickness is obtained. The thickness of the coating within limits depends upon the composition of the emulsion, the voltage and current density employed and the time of depositing. The particles cohere together in the deposit; that is, they associate together with sufficient force to permit of the subsequent washing, vulcanizing and similar treatments.

When the surface has a coating of the desired thickness, it may be removed from the bath and washed with water, preferably hot water. If the vulcanizing agent is in the deposited coating in a sufficient amount, the vulcanization of the coating can be carried on by packing in a vessel and heating in accordance with the usual practice. If the coating does not contain the vulcanizer, or if it contains only an insufficient amount, then the packing in the vessel with a suitable separating powder will include a vulcanizing agent, as will be apparent to those skilled in the art. Any well known method of vulcanization can be employed. For instance, the coatings can be wholly or partially vulcanized by treatment in solutions of sulfur in sulfur dichloride. By a suitable manipulation the vulcanizing may be to any degree between almost no vulcanizing and the condition of hard rubber. It is sometimes useful to deposit the accelerator with the rubber but without any vulcanizer. The coating thus obtained vulcanizes readily by any usual method.

While our process is particularly adapted to the coating of entire metal articles by electro-deposition, it can be applied to any article having an electro-conducting surface on the whole or part of its entire periphery. Nor need the conducting surface be always metallic, for non-conducting objects, such as wood for example, may be made sufficiently conducting to serve as anodes for receiving the deposition by coating them superficially with a conducting graphite layer or by impregnating them with solutions of electrolytes. Moreover, our finished rubber coatings may be separated from the object when the latter is designed or prepared for that purpose. In general a graphite coating will aid in such separation. In this way within limits articles may be moulded by depositing the rubber upon a suitably shaped contacting surface, from which it is stripped after deposition and vulcanization, if desired. Hollow articles may be prepared by coating the rubber on forms of fusible material, such as wax coated with graphite or low fusible metals. The amount of soap or other emulsifying agent that remains in the deposit does not impair it, the final coating being for all ordinary purposes as useful as though prepared in other ways. Where the minimum amount of mineral matter is desired in the deposit, for instance when its electrical resistance is to be emphasized, the emulsifying agent may be in the form of a soap containing ammonium as the base. During vulcanization ammonia splits off and is driven away.

While we prefer to use a good castile soap as an emulsifier, we may employ any of the usual emulsifying agents, such as compounds of the several fatty acids, whether saturated or unsaturated, with alkali metals or ammonium, sodium phenolate, cresolate, etc., (whether or not an excess of cresol or cresylic acid can be used). While an auxiliary or intermediate emulsifier, such as sulfonated castor oil, is not indispensable, it is very useful, being partly soluble in water and bezol, and thus facilitating the formation of the conducting emulsion.

During the deposition various plating expedients may be employed. Small metallic articles may, for example, be carried in a rotating foraminous conducting drum which acts as an electrode, this being analogous to well known depolarizing and burnishing practice. Such articles could, of course, be carried in an anode in the form of an eccentrically driven wire cage. The emulsion can be agitated or directed as a stream onto the anode surface to be coated, but this is ordinarily unnecessary. It is desirable that the surfaces to be coated with a permanent layer be clean. They can, for instance, be degreased by heat or suitable solvents.

Having thus described our invention, what we claim as new and desire to secure by Letters Patent is:

1. The process of depositing rubber on an electroconducting surface of an object, which comprises the steps of bringing said surface into contact with an electroconducting rubber emulsion and passing a depositing electric current through said surface and emulsion, said emulsion being substantially free from material in a fermentable state.

2. The process of depositing rubber and a conditioning agent therefor onto an electroconducting surface of an object, which comprises the steps of bringing said surface into contact with an electroconducting rubber emulsion containing a conditioning agent for the rubber and passing an effectively unidirectional depositing electric current through said surface and emulsion.

3. The process of depositing rubber onto an electroconducting surface of an object, which comprises the steps of bringing said surface into contact with an electroconducting rubber emulsion containing main and auxiliary emulsifying agents, and passing an effectively unidirectional depositing electric current through said surface and emulsion.

4. The process of depositing rubber and vulcanizing material onto an electroconducting surface of an object, which comprises the steps of bringing said surface into contact with an electroconducting rubber emulsion containing vulcanizing material, and passing an effectively unidirectional depositing electric current through said surface and emulsion.

5. The process of depositing rubber and an accelerator of vulcanization onto an electroconducting surface of an object, which comprises the steps of bringing said surface into contact with an electroconducting rubber emulsion containing an accelerator of vulcanization and passing an effectively unidirectional depositing electric current through said surface and emulsion.

6. The process of depositing rubber and coloring material onto an electroconducting surface of an object, which comprises the steps of bringing said surface into contact with an electroconducting rubber emulsion containing coloring material and passing an effectively unidirectional depositing electric current through said surface and emulsion.

7. The process of depositing rubber and coloring material, vulcanizing material and an accelerator of vulcanization onto an electroconducting surface of an object, which comprises the steps of bringing said surface into contact with an electroconducting rubber emulsion containing coloring material, vulcanizing material and an accelerator of vulcanization, and passing an effectively unidirectional depositing electric current through said surface and emulsion.

8. The process of preparing vulcanized rubber, which comprises the steps of electrodepositing rubber on an electrode surface in a definite shape from an electroconducting emulsion of rubber and vulcanizing the deposited rubber while it remains in said shape.

9. The process of preparing modified rubber, which comprises the steps of electrodepositing rubber and a conditioning agent therefor onto an electrode surface from an electroconducting rubber emulsion containing said conditioning agent and thereafter inducing interaction between said deposited rubber and said deposited conditioning agent.

10. The process of preparing vulcanized rubber, which comprises the steps of electrodepositing rubber and vulcanizing material onto an electrode surface from an electroconducting rubber emulsion containing said material, and thereafter inducing a vulcanizing action on said deposited rubber by said deposited vulcanizing material.

11. The process of preparing vulcanized rubber, which comprises the steps of electrodepositing rubber and an accelerator of vulcanization onto an electrode surface from an electroconducting emulsion of rubber containing said accelerator, and thereafter vulcanizing said deposited rubber and accelerator.

12. The process of preparing colored vulcanized rubber, which comprises the steps of depositing rubber and coloring material onto an electrode surface from an electroconducting emulsion of rubber containing said material and thereafter vulcanizing said deposited rubber and material.

13. The process of forming a coherent deposit of rubber on an electroconducting surface of an object which comprises the steps of immersing said surface in an aqueous electroconducting emulsion of rubber particles movable by electric current, and passing an effectively unidirectional electric current through said surface and emulsion in a direction to move and cohere said particles onto said surface, said emulsion being substantially free from material in a fermentable state.

14. The process of forming a coherent deposit of rubber and vulcanizing material on an electroconducting surface of an object, which comprises the steps of immersing said surface in an aqueous electroconducting emulsion of rubber particles, said particles carrying vulcanizing material and being movable by electric current, and passing an effectively unidirectional electric current through said surface and emulsion in a direction to move and cohere said particles onto said surface.

15. The process of forming a coherent deposit of rubber and an accelerator of vulcanization on an electroconducting surface of an object, which comprises the steps of immersing said surface in an aqueous electroconducting emulsion of rubber particles, said particles carrying an accelerator of vulcanization and being movable by electric current, and passing an effectively unidirectional electric current through said surface and emulsion in a direction to move and cohere said particles onto said surface.

16. The process of forming a coherent deposit of rubber and coloring material on an electroconducting surface of an object, which comprises the steps of immersing said surface in an aqueous electroconducting emulsion of rubber particles, said particles carrying coloring material and being movable by electric current, and passing an effectively unidirectional electric current through said surface and emulsion in a direction to move and cohere said particles onto said surface.

17. The process of forming a coherent deposit of rubber and coloring material, vulcanizing material, and an accelerator of vulcanization on an electroconducting surface of an object, which comprises the steps of immersing said surface in an aqueous electroconducting emulsion of rubber particles, said particles carrying coloring material, vulcanizing material, and an accelerator of vulcanization and being movable by electric current, and passing an effectively unidirectional electric current through said surface and emulsion in a direction to move and cohere said particles onto said surface.

18. The process of preparing vulcanized rubber, which comprises the steps of immersing an object having an electroconducting surface in an aqueous electroconducting emulsion of rubber particles movable by electric current, passing an effectively unidirectional electric current through said surface and bath in a direction to move and deposit said particles onto said surface, and thereafter vulcanizing the deposit.

19. The process of preparing vulcanized rubber, which comprises the steps of immersing an object having an electroconducting surface in an aqueous electroconducting emulsion of rubber particles movable by electric current, said particles carrying vulcanizing material, passing an effectively unidirectional electric current through said surface and emulsion in a direction to move and deposit said particles onto said surface and thereafter vulcanizing the deposit.

20. The process of preparing vulcanized rubber, which comprises the steps of immersing an object having an electroconducting surface in an aqueous electroconducting emulsion of rubber particles movable by electric current, said particles carrying an accelerator of vulcanization, passing an effectively unidirectional electric current through said surface and emulsion in a direction to move and deposit said particles onto said surface and thereafter vulcanizing the deposit.

21. The process of preparing vulcanized rubber, which comprises the steps of immersing an object having an electroconducting surface in an aqueous electroconducting emulsion of rubber particles movable by electric current, said particles carrying coloring material, passing an effectively unidirectional electric current through said surface and emulsion in a direction to move and deposit said particles onto said surface and thereafter vulcanizing the deposit.

22. The process of preparing vulcanized rubber, which comprises the steps of immersing an object having an electroconducting surface in an aqueous electroconducting emulsion of rubber particles movable by electric current, said particles carrying coloring material, vulcanizing material and an accelerator of vulcanization, passing an effectively unidirectional electric current through said surface and emulsion in a direction to move and deposit said particles onto said surface and thereafter vulcanizing the deposit.

23. The process of depositing rubber on an electroconducting surface of an object, which comprises the steps of bringing said surface into contact with an electroconducting emulsion in water which includes rubber and soap, and passing an effectively unidirectional depositing electric current through said surface and emulsion.

24. The process of depositing rubber on an electroconducting surface of an object, which comprises the steps of bringing said surface into contact with an electroconducting emulsion in water which includes rubber, soap, and an auxiliary emulsifier, and passing an effectively unidirectional depositing electric current through said surface and emulsion.

25. The process of depositing rubber on an electroconducting surface of an object, which comprises the steps of bringing said surface into contact with an electroconducting emulsion in water which includes rubber, soap, and sulfonated castor oil, and passing an effectively unidirectional depositing electric current through said surface and emulsion.

26. The process of depositing rubber on an electroconducting surface of an object, which comprises the steps of bringing said surface into contact with an electroconducting emulsion in water which includes rubber, soap, and vulcanizing material, and passing an effectively unidirectional depositing electric current through said surface and emulsion.

27. The process of depositing rubber on an electroconducting surface of an object, which comprises the steps of bringing said surface into contact with an electroconducting emulsion in water which includes rubber, soap, and an accelerator of vulcanization, and passing an effectively unidirectional depositing electric current through said surface and emulsion.

28. The process of depositing rubber on an electroconducting surface of an object, which comprises the steps of bringing said surface into contact with an electroconducting emulsion in water which includes rubber, soap, and aniline sulfate, and passing an effectively unidirectional depositing electric current through said surface and emulsion.

29. The process of depositing rubber on an electroconducting surface of an object, which comprises the steps of bringing said surface into contact with an electroconducting emulsion in water which includes rubber, soap and coloring material, and passing an effectively unidirectional depositing electric current through said surface and emulsion.

30. The process of depositing rubber on an electroconducting surface of an object, which comprises the steps of bringing said surface into contact with an electroconducting emulsion in water which includes rubber, soap and lampblack, and passing an effectively unidirectional depositing electric current through said surface and emulsion.

31. The process of depositing rubber on an electroconducting surface of an object, which comprises the steps of bringing said surface into contact with an electroconducting emulsion in water which includes rubber, soap, and sulfur, and passing an effectively unidirectional depositing electric current through said surface and emulsion.

32. The process of depositing rubber on an electroconducting surface of an object, which comprises the steps of bringing said surface into contact with an electroconducting emulsion in water which includes rubber, soap, sulfonated castor oil, sulfur, aniline sulfate, and lampblack and passing an effectively unidirectional depositing electric current through said surface and emulsion.

33. The process of depositing rubber on an electroconducting surface of an object, which comprises the steps of bringing said surface into contact with an electroconducting rubber emulsion and passing a depositing electric current through said surface and emulsion, the current density averaging approximately $\frac{1}{3}$ ampere per square inch of said conducting surface.

34. The process of depositing rubber on an electroconducting surface of an object, which comprises the steps of bringing said surface into contact with an electroconducting rubber emulsion and passing a depositing electric current through said surface and emulsion at a potential of approximately 110 volts.

35. The process of forming a coherent deposit of rubber on an electroconducting surface of an object, which comprises the steps of immersing said surface in an aqueous electroconducting emulsion of rubber particles movable by electric current, and passing an effectively unidirectional electric current through said surface and emulsion in a direction to move and cohere said particles onto said surface, the average current density being approximately $\frac{1}{3}$ ampere per square inch of said surface and the potential being approximately 110 volts.

Signed at Rochester, New York, this 27th day of Feb., 1922.

SAMUEL E. SHEPPARD.
LEON W. EBERLIN.